R. W. DREW.
Sewing Machine.
No. 2.579. Reissued April 30, 1867.
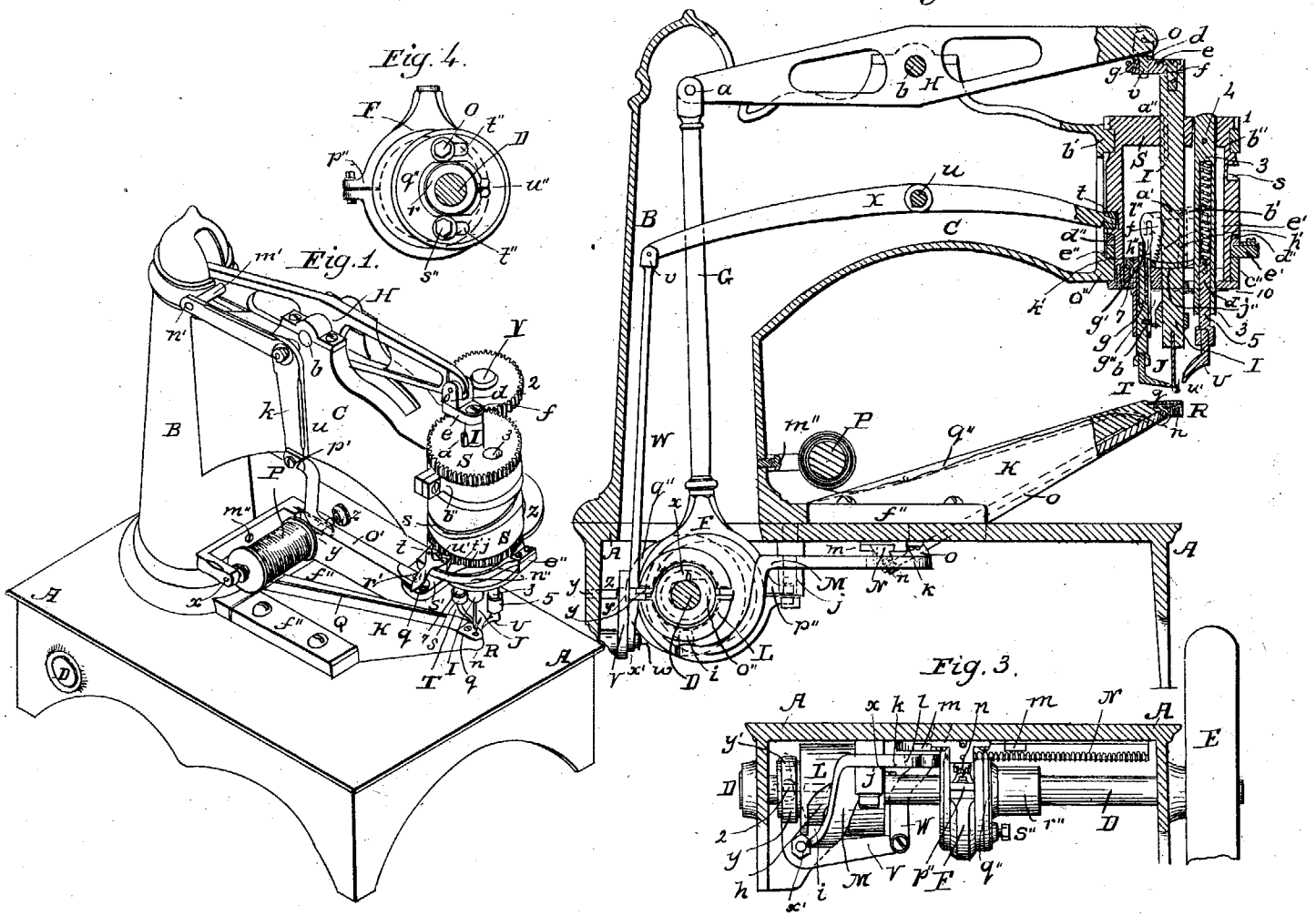
Witnesses:
Edward Marson
B. F. Tiedemann
Inventor:
Stephen H. Drew
per his Attorney
Saml. Cooper
N. PETERS, Photo-Lithographer, Washington, D. C.

UNITED STATES PATENT OFFICE.

ALFRED B. ELY, OF NEWTON, MASS., ASSIGNEE OF REUBEN W. DREW.

IMPROVEMENT IN SEWING-MACHINES.

Specification forming part of Letters Patent No. 33,677, dated November 5, 1861; reissue No. 2,579, dated April 30, 1867.

DIVISION B.

*To whom it may concern:*

Be it known that REUBEN W. DREW, of Abington, in the State of Massachusetts, has invented certain Improvements in Machine for Sewing on the Soles of Boots and Shoes, which are fully described in the following specifications and accompanying drawings.

Figure 1 is a perspective view of the machine. Fig. 2 is a vertical section of a side elevation. Fig. 3 is a front view of the parts underneath the table. Fig. 4 is a view of the adjustable eccentric.

A patent has heretofore been issued to one Lyman R. Blake for a machine in which a rest was placed on the end of an arm to reach into the toe of a shoe, but it was not adapted to sewing around toes or heels, or otherwise around circles or short curves or angles, as no efficient means were provided for placing the thread across the barb of the needle as the work progressed round a curve, or keeping the needle and thread in the same relative position to the changing line of the seam, besides other deficiencies in practice.

These improvements, which are considerable in number and importance, have regard, among other things, to such a construction and arrangement of the parts that the lines of the arm shall be straight instead of in a curve; that the needle and its adjuncts, as also the thread-guide, may be continuously revolved and correspondingly changed in position for sewing circles, curves, and angles—that is, that the needle be presented to the work resting on the arm in such manner that the barb of the needle shall strike at right angles to the line of seam, while the thread shall be laid across the barb of the needle and in the line of the seam; that the throw of the eccentric or crank, and also the length of the needle-bar, may be altered and adjusted for different kinds and thicknesses of work; that the feed may form a guiding-point for the needle and space the stitches; and that the cast-off, as well as other parts, may conform to different thicknesses of material, while it also forms a support for the needle.

The following is a description of the drawings and machine: A A is the body or frame. B is the standard; C, the goose-neck, having strapped to its end a hollow-chambered revolving cylinder, S, through which passes the needle-bar, and in which are placed the devices for operating, by means of the needle-bar, the cast-off and feed. D is the main shaft, and E the balance-wheel. F is an adjustable eccentric on the shaft D, G being the eccentric-rod, the strap of which is tightened up at $p''$. The upper end of the eccentric-rod is pivoted at $a$ to one end of a walking-beam, H, oscillating near the center of the goose-neck at $b$. To the other end of the walking-beam, at $c$, is pivoted a strap, $d$, with a projecting tongue or pin, $v''$, on the under side. This pin $v''$ passes through one end of a small bar or cap-plate, $e$, and is confined at a greater or less altitude by a set-screw, $g$, for the purpose of graduating the length of the needle-bar when the throw of the eccentric is changed so as to keep the lowermost point of descent of the needle unchanged. To the other end of this plate $e$ the needle-bar I is hung and pivoted by means of the screw or bolt $f$. The needle-bar I, with a barbed needle, J, at its ends, passes through the cylinder S, while by means of the feather $a''$ on its side taking into a corresponding groove in the head of the cylinder, the needle-bar, with its accessories, revolves with the cylinder freely in either direction, and can be operated at any position in its revolution. K is the arm placed at an acute angle with the bed of the machine and fastened to it at $f''$. This angle is such as to enable the rest R at the end of the arm to enter freely into the toe of the boot or shoe. The lines of the arm are straight instead of curved. L is a cam-cylinder hung so as to be moved longitudinally on the main shaft D, and revolving with the shaft by means of the feather $x$ on the shaft taking into a corresponding groove in the cylinder. At the end, and on a collar of this cam-cylinder, is a strap, $y$, in which the cam-collar revolves. From the rear of this strap $y$ projects a pin, $z$, extending through a slot, $d$, cut in the rear side of the machine-frame. $h$ is a slotted cam-groove cut in the cylinder L, in which plays a friction-roller, *i*. M is a bent lever pivoted to the bed-plate of the machine at *j*, and having at one end the friction-roller *i* running into the cam-groove *h*. By this means a lateral reciprocal motion, as the cam L revolves, is given to the other end of the lever M, which is slotted perpendicularly at *k*. N is a straight ratchet or geared bar running in ways *m m* across the under side of the machine, with its gear-teeth at an angle corresponding with that of the arm K, and having at one end a pin, *l*, projecting downward and into the slot *k* of the bent lever M. By this means a reciprocal motion, back and forth across the machine, is given to the bar N. O is a rod passing up through a supporting-box, *o*, and the lower side of the arm K, and having a gear-wheel, *n*, at the lower end, the teeth of which take into the teeth of the bar N. By this means the reciprocal motions of N oscillate or rotate back and forth the rod O. The upper end of O is geared beveling at *p*, and these gear-teeth take into the gear-teeth of a circular thread guide or whir, *r*, inclosed in the rest R of the arm K. Thus, while the needle is reciprocated up and down by the action of the eccentric, walking-beam, and needle-bar, the thread guide or whir is reciprocated round and back for the purpose of presenting the loop to the needle by the action of the cam, bent lever, geared bar, and geared rod, and this presentation of the loop can be properly made whatever the position of the needle. On the top of the rest R is a small plate fastened down by a screw at *q*. T is the cast-off made with a circular eye embracing the needle at *u'*, and U is the feeding-point, both being operated by the motions of the needle-bar. The feed-point U is made fast by a set-screw to a plunger, 5, which extends upward into a chambered feed-rod, 3, which is pivoted to the upper head of the cylinder at 4, and has a lateral play on this pivot. Within the chamber of the rod 3 is a spiral spring, 6, to press the feed-point to the work. On the opposite or back side, Fig. 2, upward from the plunger 5, extends a rod, *d'*, with a pin, *c'*, projecting backward near its top. *j''* is a flat spring fastened to the cylinder at *k''*, and pressing the rod 3 and feeding device outward and away from the needle. The cast-off T, with its hollow point *u'* encircling the needle, and materially strengthening and aiding it in drawing up the stitch, is made fast by a set-screw to a plunger, 8, which passes through a hollow rod, 7, fastened to the lower head of the cylinder S, and having a spiral spring, 9, in its upper part to press the cast-off to the work and adapt it to different thicknesses of material. At the upper end of the plunger 8 is a small notch, *h''*, into which the shoulder of the spring *g'* takes when it ascends. 10 is a thin slotted sliding plate on the under side of the lower head of the cylinder, surrounding both the swinging rod 3 and the needle I, and held up to cylinder by screws through slots at *w''*. *g'* is a flat spring fastened to the lower head of the cylinder at *i''*, and projecting upward, and having a shoulder at *g'*. *f'* is a small plate fastened on the side of the needle-bar I, having a quadrant-shaped pin projecting out from its rear, as shown by red lines at *l''*. *h'* is a post rising from the lower head of the cylinder, and standing on the back side of the needle-arm, to the top of which post, at *b'*, is pivoted a lever, *a'*, one end of which acts underneath and upon the pin *c'* to raise the feed-plunger 5. To the other end is fastened a small spiral spring, *e'*, fastened at its other end to the cylinder at *k''*. *i'* is a small screw or pin projecting from the plunger 8 of the cast-off, and sliding up and down in a slot, *g''*, of the hollow rod 7. *j'* is a cam projection fastened to the needle-bar below the cylinder, and capable of being adjusted to any proper height, having a step and an incline, the one to strike against the pin *i'* and raise the cast-off plunger 8, the other to strike against the sliding plate 10, and, by moving it inward, give a side swing to the feed-bars 3 and 5 and feed-point U toward the needle. When the needle-bar I descends the projection *l''* strikes upon the top of one end of the lever *a'*, forcing the other end upward against the pin *c'*, and thus raises the feed-point. The lower edge of the plate *f'*, striking against the top of the spring *g'*, and pressing it back, releases its shoulder from the notch *h''* in the cast-off plunger 8, and allows the cast-off to descend and rest upon the upper surface of the material. When the needle-bar ascends the step in the cam-projection *j'* meets the pin *i'*, and raises the cast-off till the shoulder of the spring *g'* takes into the notch *h''* and holds it suspended till the needle again descends. At the same time (the pressure of the quadrant-shaped pin *l''* upon the lever *a'* having been released) the feed-plunger descends, and the incline on *j'* striking against the sliding plate 10, moves inward the feed-point toward the needle, when it is ready for another descent of the needle-bar. *b''* and *c''* are straps for supporting and holding the cylinder S to the goose-neck C, allowing it to turn freely round. Y, Fig. 1, is a revolving standard bracketed to the goose-neck at the side and back of the revolving cylinder S. This standard has a gear-wheel, 2, on its top, meshing into the geared head 1 of the cylinder. Z is a wheel at the bottom of the standard for handling and turning it by hand. V is a bent lever pivoted to the lower back side of the frame at *x*, and having pivoted to it at one end the connecting-rod W, which extends up through the standard B, and is pivoted at its upper end, at *v*, to a cross-beam, X, which oscillates at *u* upon bearings, and has at its further end a friction-roller, *t*, which runs in a cam-slot, *s*, cut in the periphery of the revolving cylinder S. At the other end of the bent lever V is a slot, *y'*, through which passes the pin *z* of the sliding-cam cylinder L. As the cylinder S is revolved, the cam slot *s*, operating by the friction-roller *t* through the cross-beam X, the connecting-rod W, and the bent lever V, causes the cam-cylinder L to move longitudinally upon the main shaft by means of the pin *z* in the slot *y'* of the lever V, and thus, as the cam L revolves with the shaft, by means of the feather on the shaft through the cam-slot *h*, bent lever M, ratchet-bar N, and rod O, the thread guide or whir *r* is correspondingly revolved with the revolutions of the cylinder S and the needle-bar and needle, so that in this manner, while the position of the barb of the needle is changed, the position or direction of the thread is correspondingly changed, each preserving to the other the same relative position to enable the needle to take up the loop, and the operator to sew around corners and curves or angles, the object being to keep the direction of the thread along the line of seam and across the barb of the needle, so that the needle shall strike with its barb perpendicularly to the line of the seam, (the slot of the barb being in the line of the seam,) while the thread is thrown across the barb and in the line of the seam. In sewing boot and shoe soles the needle-barb should enter at right angles the edge, and the thread must be laid across it parallel with the edge of the sole, and in going round the toe the thread and thread-guide, following and conforming to the curvature of the material and seam, must constantly change their throw so as to strike across the barb of the needle with their loop.

Ordinarily, in the sewing of curves, &c., it is necessary to control the movement step by step as the work progresses, and for this reason I have adapted the standard Y with its handle Z that I may control the change and revolutions of the needle and thread guide or whir, stitch by stitch. But in order that a regular change of the position of the needle and thread, in cases where a certain defined circle or part of a circle is to be sewed, may be made automatically, the following mechanism is devised: *k'* is a bent lever on the outside of the goose-neck, pivoted to it at *l'*. *m'* is a pin fixed in the rear end of the walking-beam H, and passing through a slot in the upper end of the lever *k'* at *n'*. To the other end of lever *k'* is pivoted, at one end of it, a rod, *o'*, having its other end pivoted at *r'* to a projection, *s'*, on a strap, *e''*, passing round the cylinder S and moving loosely on it. *d''* is a circle of gear-teeth cut in the periphery of the cylinder S or on an annular wheel secured thereto immediately above the strap *e''*. *t'* is a forked dog, with a handle, *q'*, pivoted on the projection *s''* of the strap *e''*, at *v'*, and having a spring, *w'*, so arranged that either or neither of the ends of the dog *t'* may take into the gear-teeth *d''*. In this way the up-and-down motion of the walking-beam being communicated by the pin *m'* through the bent lever *k'* and rod *o'* to the dog *t'*, the cylinder is revolved either way, or not at all, at will. In a bracket, fastened to the standard B at *m''*, is hung the spool P in bearings at *x''* *y''*, the latter being in a flat spring, *n''*, set into the back of the bracket and parallel with the end. A set-screw, *z'*, passes through the further end of the bracket and strikes against this spring *n''* and regulates the tension on the spool. *q''* is the thread passing through the channel Q and up through the thread guide or whir *r*. I also use an adjustable eccentric, so as to change the throw of the eccentric or crank, &c. O'' is an elongated shaft-hole of the eccentric F, the strap of the eccentric-rod being tightened up at *p''*. *q'' r''* is a face-plate and collar on the main shaft D, having a set-screw, *w''*, through the collar behind and opposite *r''*, to secure it to the shaft. Through the face-plate are two slots, *t''*, with set-screws *s''* to secure the eccentric to the face-plate at any position in the slots. With these slots and screws and the elongated shaft-hole of the eccentric, I am enabled to change the position of the eccentric to the shaft, and to alter and adjust the throw of the eccentric as I may find desirable, and adapt it to different thicknesses and quality of material. By means of the pin *v''* in the cap-plate *e* of the needle-bar, and the set-screw *g*, I am also enabled to alter and adjust the operating length of the needle-bar, so that while I alter the throw of the eccentric I am enabled to preserve unchanged the point to which the needle must descend to take the loop. The feeding-point U, striking on and into the material in advance of the needle, and feeding up the work, spaces the distance between the stitches, and forms a guiding-point for the needle, impressing the place where it shall strike.

The method of forming the stitches in sequence is as follows: The thread having been carried up through the thread-guide, the shoe is placed on the arm with the rest inside. The needle is brought down through the sole, upper, and insole into the whir. When at its lowest point the whir is thrown around, and the thread laid across the barb. The needle is retracted, drawing up the loop. The shoe is fed forward one stitch and the needle again descends. The loop is shed from the barb, the cast-off descends to the work, and the loop is now round the cast-off and needle. The needle takes another loop and ascends through the former loop. The cast-off rises and the needle draws up the stitch. The shoe is then fed forward again. The needle descends each time through the sole, with its barb across the line of the seam, and the thread is thrown across the barb in the line of seam, and this is done following any curve of the work. To this the revolution of the whir is necessary.

*Claims.*

1. So constructing and so arranging the parts of a sewing-machine, in combination with a main operating-shaft, that the needle-bar, when positively or directly attached or coupled to its actuating-arm, can be revolved positively and freely above the work, and to any desired extent in either direction, at the will of the operator as the stitching progresses, and be made to operate for any length of time at any position of its revolution, by means substantially as described.

2. So constructing and arranging the needle-bar and the feeding-point that they can be revolved either way together and preserve their relative positions.

3. So constructing and combining the rotating needle-bar with the feeding-point that the feed shall form a guiding-point to the needle and space the stitches.

4. The combination of the spring cast-off needle and feeding-point, when constructed and arranged substantially as described.

5. The adjustable eccentric, with its connections or their equivalents, for altering and adjusting the throw of the needle-bar.

6. The mechanism, substantially as described, for revolving the needle, or it and the parts connected therewith, (or presenting them properly to the work,) by hand, that the seam may be laid in any direction as the sewing progresses.

7. Revolving the needle-bar automatically by means substantially as described.

A. B. ELY.

Witnesses:

CORNELIUS JACOBS,
JOHN P. JACOBS.